Patented Jan. 18, 1949

2,459,430

UNITED STATES PATENT OFFICE 2,459,430

PRODUCTION OF ETHYLENE CYANOHYDRIN

Albert W. Jefts and Joseph A. Schmidlein, Stamford, Conn., assignors to American Cyanamid Company, New York, N. Y., a corporation of Maine No Drawing. Application May 4, 1946, Serial No. 667,488

2 Claims. (Cl. 260—465.6)

The present invention relates to the production of ethylene cyanohydrin, and more particularly to an improved method for the production of ethylene cyanohydrin from ethylene oxide and hydrocyanic acid.

It is well known that hydrocyanic acid reacts with ethylene oxide to form ethylene cyanohydrin. In the absence of catalysts, this reaction is slow. Erlenmeyer (Liebig's Annalen 191, 261 (1878)) reports a 0 yield at 25° C. in closed tubes after eight days, and a good yield at 50° to 60° C. after four days. No further definition as to yields is mentioned by this experimenter.

According to Fick, U. S. Patent No. 1,914,326 alkylene cyanohydrins may be obtained by acting with alkylene oxides on dispersions of alkaline earth metal cyanides in aqueous solvents. Thus, for example, by bringing together ethylene oxide and an aqueous solution of calcium cyanide, ethylene cyanohydrin is formed with the separation of calcium hydroxide. It is also possible, instead of starting with the alkaline earth metal cyanide, to employ the corresponding hydroxide in an aqueous suspension and to convert it first into the cyanide by leading in hydrocyanic acid. Removal of the large quantity of alkaline earth metal hydroxide of the prior art from the aqueous alkylene cyanohydrin solution by filtration is a slow, cumbersome step, and in addition considerable washing of the filter cake is necessary to avoid substantial loss of the cyanohydrin.

The principal object of this invention is to devise a method wherein ethylene cyanohydrin may be readily and cheaply obtained. A further object is to provide an improved method for producing ethylene cyanohydrin from ethylene oxide and hydrocyanic acid. Other objects will appear hereinafter.

The foregoing objects are attained by employing a member of the group consisting of magnesium oxide, magnesium hydroxide and magnesium cyanide as a catalyst for the reaction between the hydrocyanic acid and the ethylene oxide.

Water is utilized as a diluent for the reaction. Thus, when either the oxide or cyanide of magnesium is employed, conversion to the hydroxide will take place.

A preferred method of operation comprises passing a premixed equimolar feed of ethylene oxide and hydrocyanic acid into an agitated aqueous slurry of the catalyst maintained at a temperature within the range of from about 40 to 100° C., and preferably at a temperature of from 50 to 80° C. After the addition of the reactants, the mixture is held at the desired temperature for approximately one hour to complete the reaction. At the end of this period, it is cooled to room temperature and carbonated by passing in carbon dioxide until a pH of about seven is reached. The mixture is then heated to boiling, thus causing a breakdown of the soluble magnesium bicarbonate into the insoluble carbonate. The suspension is cooled and filtered and the filter cake washed with water. The water is removed from the combined filtrate and washings by evaporation under reduced pressure. The resulting ethylene cyanohydrin solution is practically free from impurities, and may be further purified by distillation.

In each of the examples listed in Table 1 the magnesium hydroxide was suspended in 325 cc. of water. The suspension was stirred and heated at 60° C. in a reaction vessel fitted with a condenser while the premixed feed of ethylene oxide and hydrocyanic acid was added at the specified rate. After adding the reactants, the mixture was heated for one hour and the ethylene cyanohydrin recovered according to the procedure described above.

Table 1

| Example No. | HCN Feed Grams | (CH₂)₂O Feed Grams | Feed Rate Grams/min. | Mg(OH)₂ Catalyst Grams | Percent Yield Ethylene Cyanohydrin |
|---|---|---|---|---|---|
| 1 | 141 | 220 | 5.69 | 30.1 | 92.6 |
| 2 | 143.6 | 220 | 4.13 | 30.1 | 91.6 |
| 3 | 138 | 220 | 1.63 | 30.1 | 92.6 |
| 4 | 138 | 220 | 1.62 | 15.0 | 91.4 |
| 5 | 138 | 220 | 1.65 | 10.0 | 92.5 |
| 6 | 138 | 220 | 1.68 | 5.0 | 92.9 |
| 7 | 138 | 220 | 1.66 | 2.5 | 92.0 |

In the examples listed in Table 2 the reactants were mixed together and the mixture fed to the aqueous suspension of the catalyst held in a closed vessel. Magnesium hydroxide was used as the catalyst in Examples 8–14 inclusive, and magnesium oxide in Example 15.

Table 2

| Example No. | HCN Feed | $(CH_2)_2O$ Feed | Water for Catalyst | Catalyst | Time of feed | Reaction Temp. | Percent Yield Ethylene Cyanohydrin |
|---|---|---|---|---|---|---|---|
| | Lbs. | Lbs. | Lbs. | Lbs. | Minutes | °C. | |
| 8 | 90 | 143 | 212 | 1.6 | 182 | 60 | 95.2 |
| 9 | 90 | 143 | 212 | 1.6 | 231 | 60 | 95.9 |
| 10 | 90 | 143 | 212 | 1.6 | 130 | 60 | 95.5 |
| 11 | 50 | 80 | 118 | 0.89 | 127 | 60 | 96.0 |
| 12 | 50 | 80 | 118 | 0.89 | 125 | 80 | 94.2 |
| 13 | 50 | 80 | 118 | 0.89 | 70 | 100 | 91.0 |
| 14 | 50 | 80 | 118 | 0.89 | 127 | 70 | 93.9 |
| 15 | 50 | 80 | 118 | 0.65 | 127 | 60 | 95.1 |

The present method produces ethylene cyanohydrin in excellent yields with substantially no decomposition and/or polymerization of the reactants and product. This method avoids the use of large quantities of catalyst such as the alkaline earth metal hydroxides employed in prior art processes. Hence, this smaller amount of catalyst makes filtration easier and reduces loss of product to the filter cake in the recovery step. A further advantage of the present method is that the catalyst may be allowed to remain in the crude product while the latter is dehydrated at elevated temperatures in the production of acrylonitrile. On the other hand, when aqueous ethylene cyanohydrin in contact with a considerable amount of calcium hydroxide is heated to temperatures required for dehydration of the cyanohydrin, steady decomposition takes place with the formation of high boiling materials and the release of ammonia.

While the invention has been described with particular reference to specific embodiments, it is to be understood that it is not to be limited thereto but is to be construed broadly and restricted solely by the scope of the appended claims.

We claim:

1. A method of producing ethylene cyanohydrin which comprises bringing ethylene oxide together with hydrocyanic acid into contact with a heated aqueous suspension of a compound selected from the group consisting of magnesium oxide, magnesium hydroxide, and magnesium cyanide in which the aqueous suspension is maintained at a temperature within the range of 40 to 100° C.

2. A method of producing ethylene cyanohydrin which includes the steps of reacting together ethylene oxide and hydrocyanic acid in an aqueous suspension of magnesium hydroxide maintained at a temperature of from 50 to 80° C., and recovering the thus formed ethylene cyanohydrin therefrom.

ALBERT W. JEFTS.
JOSEPH A. SCHMIDLEIN.

REFERENCES CITED

The following references are of record in the file of this patent:

UNITED STATES PATENTS

| Number | Name | Date |
|---|---|---|
| 1,914,326 | Fick | June 13, 1933 |
| 2,390,519 | Davis et al. | Dec. 11, 1945 |

FOREIGN PATENTS

| Number | Country | Date |
|---|---|---|
| 348,134 | Great Britain | Apr. 30, 1931 |
| 570,031 | Germany | Feb. 10, 1933 |
| 702,023 | France | Jan. 19, 1931 |

OTHER REFERENCES

Hackh's Chem. Dictionary (2nd ed. Blakiston) p. 695 (1937).